STRETCHER

Original Filed Oct. 27, 1969 3 Sheets-Sheet 1

INVENTOR
SIMON STEVENS
BY Irving M. Weiner
ATTORNEY

STRETCHER

Original Filed Oct. 27, 1969 3 Sheets-Sheet 2

United States Patent Office

Re. 28,056
Reissued June 25, 1974

28,056

STRETCHER

Simon Stevens, Emmen, Netherlands, by Stero N.V., Emmen, Netherlands, assignee

Original No. 3,654,644, dated Apr. 11, 1972, Ser. No. 869,579, Oct. 27, 1969. Application for reissue Nov. 15, 1972, Ser. No. 306,745
Claims priority, application Netherlands, Feb. 7, 1969, 6903052
Int. Cl. A61g *7/10;* B66f *11/00*
U.S. Cl. 5—81 4 Claims

Matter enclosed in heavy brackets [ ] appears in the original patent but forms no part of this reissue specification; matter printed in italics indicates the additions made by reissue.

ABSTRACT OF THE DISCLOSURE

A stretcher having an endless belt of flexible material guided by two spaced-apart parallel guides on a frame. A supporting plate is affixed to the frame under the flexible belt. Mounted on the frame is a propulsion mechanism coupled to a driving mechanism for driving the belt in a circumferential direction in such a way that, on moving the frame in the longitudinal direction of the belt with respect to the ground, a corresponding displacement of the belt in the opposite direction is effected.

Problems have always been encountered in attempting to lift injured persons from the ground for transport to the hospital. In addition, the transport itself also presents many problems, which up till now have not been satisfactorily resolved.

Physicians agree that an injured person should stay as much as possible in the condition and position in which he is found until a qualified person attends to the transportation of the injured person. Lifting and changing the position of an injured person may give rise to serious additional injuries (e.g., fractures of the spine, fractures of the members which may become complicated, etc.). To lift an injured person in a proper way, at least three, but preferably four skilled assistants are required. Even then, it is inevitable that the injured person is placed on the stretcher in a position different from the one immediately after the injury or accident, and there is surely a risk that just the displacement of the injured person and his transportation cause additional, and often serious injuries.

Some previously known stretchers use a belt of flexible material rolled up with two draw tapes to form a cylinder which can be placed under the injured person by positioning the roll under the head or the feet and unrolling it underneath the injured person. In this way, presumably no shifting movement between the belt and the injured person is produced, the belt being placed under the injured person without the necessity of altering the position of the latter. However, this known device has the drawback that, owing to the movement of the rather thick roll underneath the body of the injured person, a certain up and down movement of the injured person is still produced. Furthermore, the injured person is lifted by drawing taut and lifting the supporting belt. Inevitably, the supporting belt sags slightly, which is a considerable drawback. Also, to use the known stretcher the injured person must be accessible on both sides.

SUMMARY OF THE INVENTION

The present invention provides a stretcher including a frame and at least two guide members rotatably mounted on the frame. An endless belt is mounted around and guided by the guide members. There is also provided means for rotating the guide members which impart motion to the endless belt. There is also provided means for causing the stretcher to translate relative to the surface upon which the stretcher rests.

The present invention also provides a stretcher with which an injured person can be lifted in such a way that any change of position of the body of the injured person will be avoided. This stretcher includes a belt which is itself closed and is guided via at least two parallel guides accommodated in spaced relationship from one another in a frame. A fixed supporting plate is provided between the guides and the frame. The frame is provided with a propulsion mechanism which can be coupled to a driving mechanism for driving the supporting belt in a circumferential direction in such a way that, when the frame is moved in the longitudinal direction of the supporting belt with respect to the ground, a corresponding displacement of the supporting belt in the opposite direction is brought about.

During use, the stretcher is as a whole brought under the body of the injured person by means of the propulsion mechanism whereby, due to the movement of the supporting belt with respect to the fame, the rigid supporting plate is brought under the body without any displacement of the body with respect to the ground. So, for instance, an already commenced mouth-to-mouth resuscitation need not be interrupted as the injured person is placed on the stretcher. As a consequence, the body is brought on the supporting plate in exactly the same position as in which it was found. Any supporting cushion, garments and the like are also put on the stretcher in exactly the same position. The stretcher can thereafter be brought to the room in which treatment is to take place. By reversing the movement described hereinbefore the injured person can thereupon, if necessary be laid on the examining table still in exactly the same position as in which he was found. Even utter laymen are able to lift an injured person by means of a stretcher according to the invention, and to displace the person without any risk of additional injuries, the stretcher being handled by one person. It is obvious that this is a very great advantage because after traffic accidents the injured persons can be moved in the position in which they lie from a dangerous place to a less dangerous location and it is not necessary to wail until a qualified person has handled or agreed to the transportability. Moreover, this movement can be performed by a single unskilled person.

When a disconnectable coupling is present between the drive of the frame and that of the belt it is possible to remove an injured person from an inaccessible location, e.g., from under a vehicle, by bringing the injured person on the stretcher by advancing the stretcher, whereafter the coupling is disconnected and the stretcher retracted.

The propulsion mechanism of the frame preferably includes an endless belt provided in the frame under the supporting belt and guided by a number of parallel supporting rollers which rest on the ground. Due to this feature a uniform locomotion or translation of the stretcher, especially on rugged ground, is ensured.

At the end of the frame, two parallel driving rollers may be provided, between which both the supporting belt and the driving belt are guided. These rollers are driven in such a way that the respective circumferential velocities are substantially equal. A chain wheel may be provided on each roller axle over which also a driving chain is guided by a driving gear wheel.

The driving belt may be composed of two narrow juxtaposed belt parts which are each slung over a separate driving roller and which can be driven synchronously as well as independently of each other. Due to this feature it becomes possible, when the driving mechanism consists of a remote-controlled electric motor system, to move and control the stretcher similar to a tracked vehicle. In this way, by using a stretcher according to the invention provided with remote control and electrically driven, an injured person can be removed from a minefield, especially since the weight of the stretcher is distributed over a large surface area and the low surface pressure does not affect the mine detonators.

DETAILED DESCRIPTION OF SOME EXEMPLARY EMBODIMENTS OF THE INVENTION

Figure 1A:
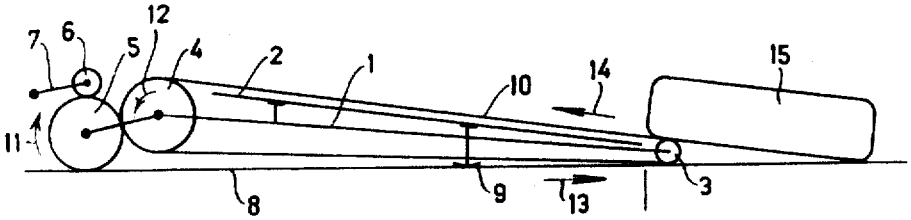
FIGS. 1a, 1b and 1c represent diagrammatically the principles of operation of a stretcher according to the invention.
Figure 1B:
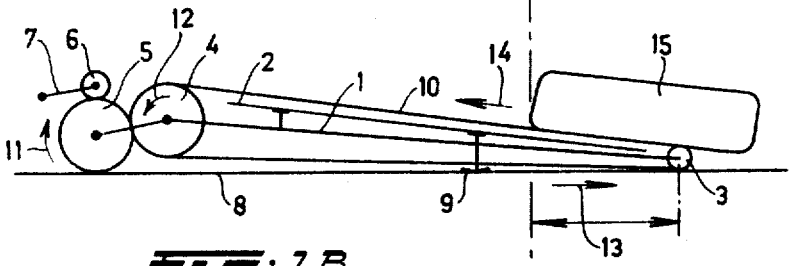
Figure 1C:
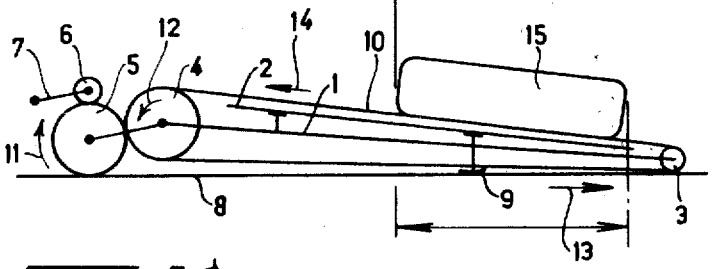

The FIGS. 1a to 1c show diagrammatically a possible, simple embodiment of the invention. The idea underlying the invention will be clarified with reference to these figures.

The stretcher according to FIG. 1 consists of a diagrammatically represented frame 1 and a supporting plate 2 fixedly connected therewith. A guide roller 3 for a belt 10 is provided at the front end of the frame 1, and a guide roller 4 for the belt 10 and a travelling roller 5 are provided at the rear end of the frame 1. The travelling roller 5 is driven via the pinion 6 and the crank 7. The frame 1 bears on a surface or ground 8 via the travelling roller 5 and the skate 9 in such a way that the roller 3 is slightly above the ground 8. The endless belt 10 is provided around the guide rollers 3 and 4.

When the travelling roller 5 is driven in the direction of the arrow 11, the roller 4 and consequently the belt 10 will be moved in the direction of the arrow 12. When the rollers 4 and 5 have the same diameter the respective circumferential or linear velocities of the roller 5, the roller 4 and the belt 10 are equal. Upon driving the roller 5, the frame 1 moves rightward in the direction of the arrow 13, and the upper portion of belt 10 moves leftwards with respect to the frame in the direction of the arrow 14 over the supporting plate 2. This means that, when the front roller 3 comes underneath an object 15 to be lifted from the ground 8, this object 15 will be transferred to the supporting plate 2 without its position with respect to the ground 8 being changed. No shift of the belt 10 with respect to the underside of the object 15 occurs; the belt 10 is so to speak "unrolled" underneath the object 15. The object 15 is transferred to the supporting plate 2, the belt 10 serving as an intermediate layer, in exactly the same position as that in which the object 15 and portions thereof were with respect to the ground 8. This means that when the object 15 is a human being, he can be transferred to the stretcher without the position of the body being changed.

FIG. 1b shows the situation in which the object 15 is halfway on the supporting plate 2. FIG. 1c shows the situation in which the object 15 is entirely on the supporting plate 2. If now the travelling roller 5 is disengaged from the driving guide roller 4, the entire stretcher can be displaced with respect to the ground 8 without the position of the object 15 on the supporting plate 2 being changed. Eventually, the entire stretcher may also be lifted and displaced.

In order to lift the object 15 from the supporting plate 2 the aforementioned movements are reversed.

Figure 2:
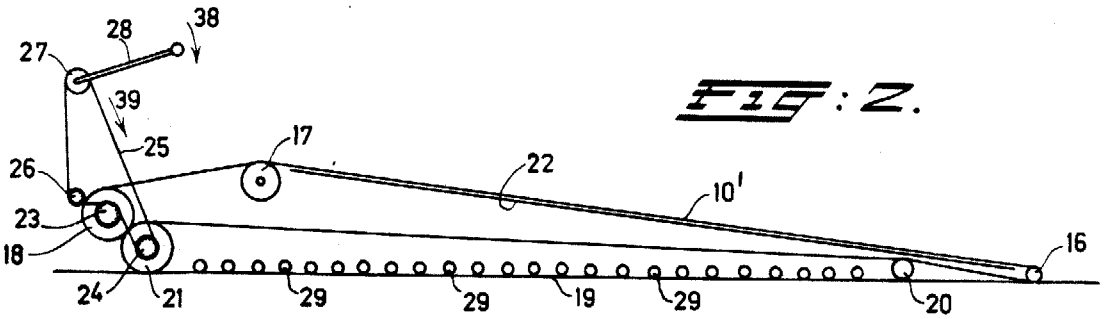
FIG. 2 represents diagrammatically an embodiment tested in practice.

FIG. 2 shows diagrammatically and schematically a cross-section of an embodiment successfully tested in practice. In this embodiment, an endless belt 19 is used for driving or translating the stretcher.

A supporting belt 10 is guided by a front small guide roller 16, a guide roller 17 situated at the rear end of the stretcher, and a driving roller 18. A traveling belt 19 is guided by a front guide roller 20 and a driving roller 21. Under the supporting belt 10: is a supporting plate 22. Gear wheels 23 and 24 are provided on the axles of the rollers 18 and 21, respectively. The gear wheels 23 and 24 are driven via a chain 25 which is further guided by a tension gear wheel 26 and driven via a gear wheel 27 by means of a crank 28.

The rollers 16, 17, 18, 20 and 21 and the gear wheels 26 and 27 are held in a suitable frame (not shown in this figure) which likewise carries the supporting plate 22. The frame further supports a number of horizontal supporting rollers 29 by which the entire unit bears on the ground.

Figure 5:
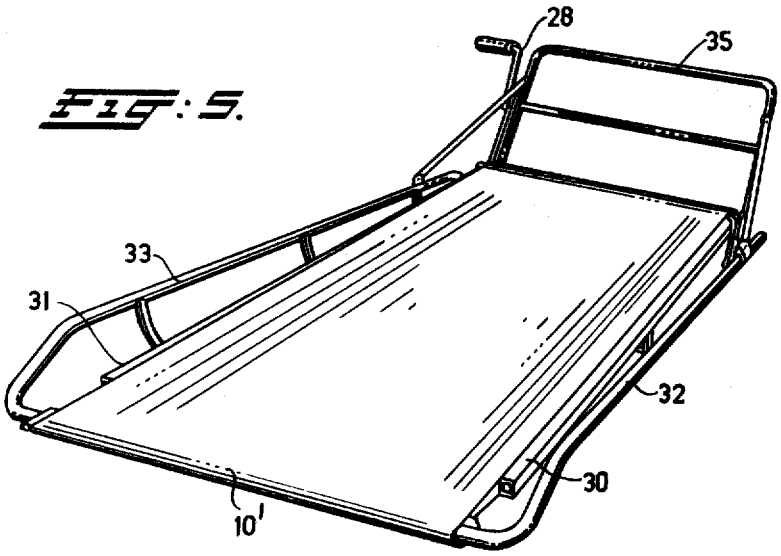
FIG. 5 is a perspective view of the stretcher according to FIG. 2.

With reference to FIG. 5, a frame includes two longitudinal girders 30 and 31 in which the supporting rollers 29 are supported. These longitudinal girders 30 and 31 are provided between two other longitudinal girders 32 and 33, respectively, which at their front end carry the guide roller 16. This guide roller 16 is in fact a combination of a number of short individually supported rollers in order to ensure the necessary rigidity.

Figure 6:
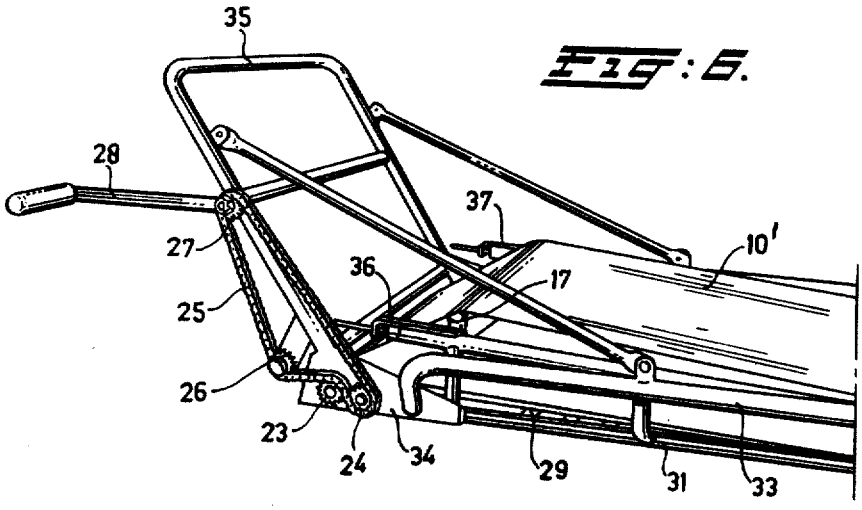
FIG. 6 is a perspective view of the driving mechanism of the stretcher according to FIG. 2.

The longitudinal girders 32 and 33 each carry a fastening plate 34 (see FIG. 6) in which the rollers 18 and 21 are supported. These plates 34 carry furthermore a frame 35 in which the driving gear wheel 27 and the crank 28 are supported. The roller 17 is secured to two sliding pieces 36 and 37 by means of which the supporting belt 10: can be tensioned.

The device operates as follows (see FIGS. 2, 3 and 4).

Upon turning the crank 28 in the direction of the arrow 38, the chain 25 moves in the direction of the arrow 39, the roller 18 moves in the direction of the arrow 40, and the roller 21 moves in the direction of arrow 41. The lower portion of belt 19 moves in the direction of the arrow 42, and the upper portion of belt 19 moves in the direction of the arrow 43. The lower portion of the belt 10: moves in the direction of the arrow 44, and the upper portion of the belt 10: moves in the direction of the arrow 45. It appears that the same movements are brought about as in the embodiment shown in FIGS. 1a to 1c. That is, the entire stretcher moves rightward and, since the diameter of the rollers 18 and 21 is equal and of the gear wheels 23 and 24 is equal, the upper portion belt 10; moves leftward with an equal speed with respect to the frame. Therefore, this effect need not further be described.

Figure 3:
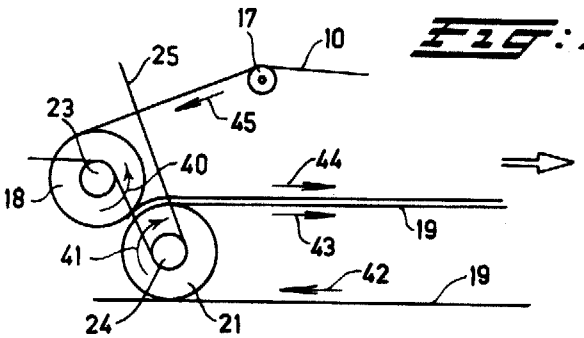
FIG. 3 shows to a larger scale another detail of the embodiment according to FIG. 2.
Figure 4:
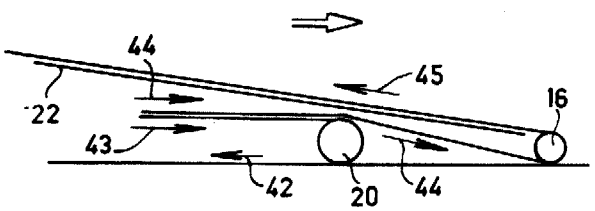
FIG. 4 shows to a larger scale another detail of the stretcher according to FIG. 2.

The FIGS. 3 and 4 show in an enlarged scale the situation at the rear drive end and at the front end, respectively, of the stretcher. It appears from these figures how the belts 10 and 19 are provided about the guide rollers.

It should be noted that the stretcher may be provided with a liftable wheel system so that a displacement is possible without the traveling belt 19 being in contact with the ground. The stretcher can further be provided with a suitable safeguard structure in order to lift and transport, for example, patients contaminated by radioactivity.

I claim:

1. A stretcher, comprising, in combination:

a frame;

at least two guide members rotatably mounted on said frame;

an endless supporting belt mounted around and guided by said guide members as a support for an object to be transported by said stretcher;

means for rotating said guide members which impart motion to said endless belt;

a supporting pate rigidly affixed to said frame between said guide members;

said supporting plate being disposed below said endless belt and being slightly upwardly inclined toward the rear end of said frame;

means for causing said stretcher to translate relative to the surface upon which said stretcher rests;

said means for causing said stretcher to translate comprises at least one travelling roller disposed at the rear end of said frame;

means for rotating said travelling roller;

at least one skate disposed at the front end of said frame, both said travelling roller and said skate being in contact with said surface upon which said stretcher rests;

said guide members comprise at least two guide rollers disposed in spaced relationship from one another upon said frame;

said guide rollers include one guide roller having a diameter smaller than the other guide rollers;

said guide roller having said smaller diameter being disposed at the front end of said frame; said endless supporting belt being mounted around and guided by said guide rollers;

said means for rotating said guide rollers comprises at least one driving pinion adapted to engage said travelling roller;

a means for rotating said pinion;

said travelling roller being adapted to engage and disengage at least one of said guide rollers;

a rotary motion of said guide rollers being effected through mutual contact of said guide roller and said pinion with said travelling roller;

said rotary motion of said guide rollers causing said endless supporting belt to translate relative to said frame in the direction of rotation of said guide rollers;

and said means for rotating said travelling roller comprises said driving pinion in engagement with said travelling roller, a rotary motion of said travelling roller being effected through said engagement with said pinion, said rotary motion of said travelling roller causing said stretcher to translate relative to the surface upon which said travelling roller rests.

2. A stretcher comprising, in combination:

a frame;

at least two guide members rotatably mounted on said frame;

an endless supporting belt mounted around and guided by said guide members as a support for an object to be transported by said stretcher;

means for rotating said guide members which impart motion to said endless belt;

a supporting plate rigidly affixed to said frame between said guide members;

said supporting plate being disposed below said endless belt and being slightly upwardly inclined toward the rear end of said frame;

means for causing said stretcher to translate relative to the surface upon which said stretcher rests;

said guide members comprise at least three guide rollers disposed in spaced relationship with one another on said frame;

said guide rollers include a first guide roller having a diameter smaller than the other guide rollers;

said first guide roller having said smaller diameter being disposed at the front end of said frame;

a second said guide roller being disposed at the rear end of said frame;

a third said guide roller being disposed between said first and second guide rollers and being slidably mounted on said frame to act as a tensioning device for said endless supporting belt;

said means for rotating said guide members has at least one gear wheel provided on said second guide roller;

a driving chain is in contact with said gear wheel;

said chain is guided by a tension gear wheel; said chain is driven by a crank whereby a movement of said crank causes said chain to translate, which translation of said chain in contact with said gear wheel causes said third guide roller to rotate about its axis, thus causing said endless supporting belt to translate relative to said frame in the direction of rotation of said third guide roller;

said means for causing said stretcher to translate has a plurality of supporting rollers;

an endless travelling belt is mounted around and guided by said supporting rollers;

a gear wheel is provided on at least one of said supporting rollers; and said chain is in contact with both said gear wheels so as to cause said supporting rollers to rotate in the opposite direction of rotation of said third guide roller whereby, a movement of said crank causes said chain to translate which translation of said chain in contact with said supporting rollers causes said supporting rollers, and said stretcher to translate relative to the surface on which it rests.

3. A stretcher characterized in accordance with claim 2, wherein:

said endless supporting belt is spaced apart from said endless travelling belt; and said endless supporting belt can be driven either synchronously or independently of said endless travelling belt.

4. A stretcher characterized in accordance with claim 2, wherein the respective circumferential velocities of said guide roller and said support roller provided with said gear wheels are substantially equal.

References Cited

The following references, cited by the Examiner, are of record in the patented file of this patent or the original patent.

UNITED STATES PATENTS

| | | | |
|---|---|---|---|
| 2,918,681 | 12/1959 | Davis | 5—81 |
| 3,418,670 | 12/1968 | Morgan | 5—81 |
| 3,493,979 | 2/1970 | Koll et al. | 5—81 |

FOREIGN PATENTS

| | | | |
|---|---|---|---|
| 6,903,052 | 8/1970 | Netherlands | 5—81 |
| 1,102,119 | 2/1968 | Great Britain | 5—81 |

CASMIR A. NUNBERG, Primary Examiner

U.S. Cl. X.R.

5—82

PO-1050
(5/69)

UNITED STATES PATENT OFFICE
CERTIFICATE OF CORRECTION

Patent No. RE-28056 Dated June 25, 1974

Inventor(s) Simon Emmen Stevens

It is certified that error appears in the above-identified patent and that said Letters Patent are hereby corrected as shown below:

On the title page, Column 1, line 8, after "Claims priority, application Netherlands," change "Feb. 7, 1969," to --Feb. 27, 1969,--.

Signed and sealed this 3rd day of December 1974.

(SEAL)
Attest:

McCOY M. GIBSON JR.
Attesting Officer

C. MARSHALL DANN
Commissioner of Patents